(No Model.) 2 Sheets—Sheet 1.

J. D. SENATE.
MACHINE FOR MAKING CLOTHES PINS.

No. 323,453. Patented Aug. 4, 1885.

Witnesses: Inventor:—
W. A. Seward. James Dearborn Senate
John R. Woods. by James W. See Attorney (No Model.) 2 Sheets—Sheet 2.
J. D. SENATE.
MACHINE FOR MAKING CLOTHES PINS.
No. 323,453. Patented Aug. 4, 1885.
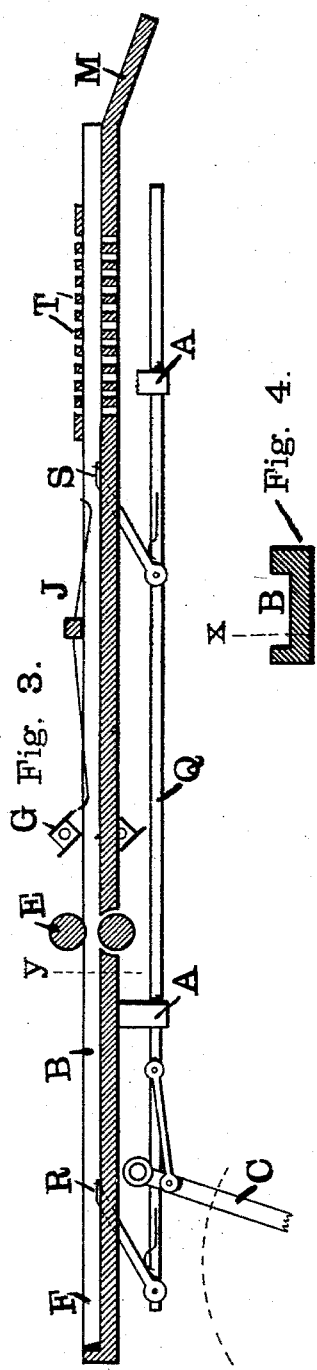
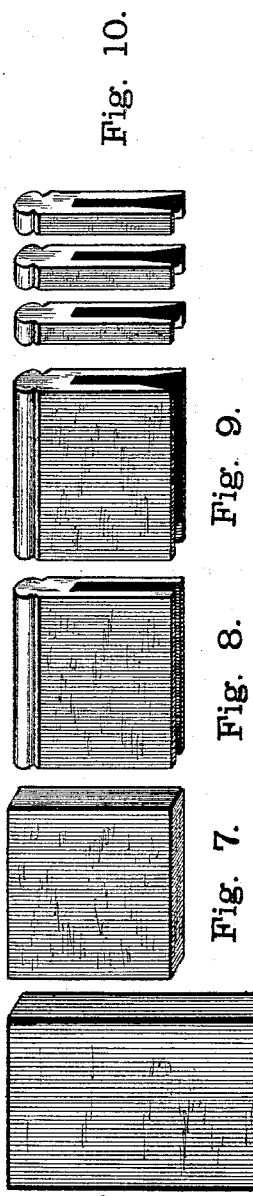
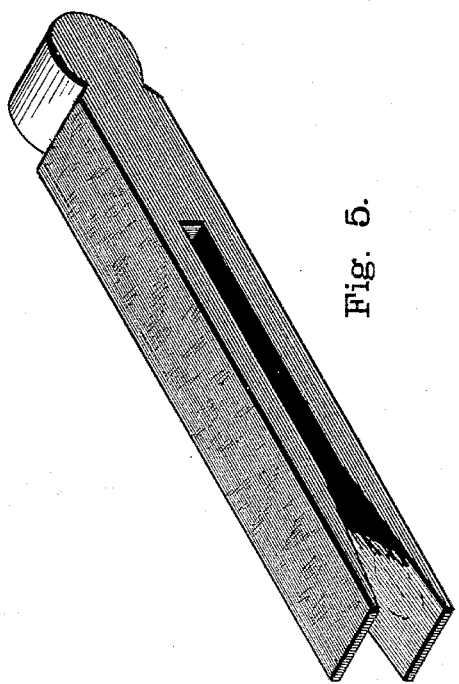
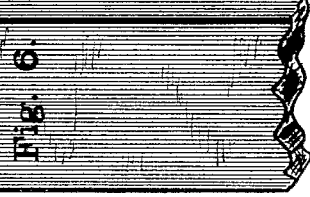
Witnesses:
W. A. Seward
John Rhoades
James Hurborn Senate
Inventor
by James W. See
Attorney

UNITED STATES PATENT OFFICE.

JAMES DEARBORN SENATE, OF BUNKER HILL, OHIO.

MACHINE FOR MAKING CLOTHES-PINS.

SPECIFICATION forming part of Letters Patent No. 323,453, dated August 4, 1885.

Application filed May 22, 1885. (No model.)

*To all whom it may concern:*

Be it known that I, JAMES DEARBORN SENATE, of Bunker Hill, Butler county, Ohio, have invented certain new and useful Improvements in Clothes-Pin Machines, of which the following is a specification.

This invention pertains to machinery for the manufacture of square clothes-pins, and it will be readily understood from the following description, taken in connection with the accompanying drawings, in which—

Figure 1:
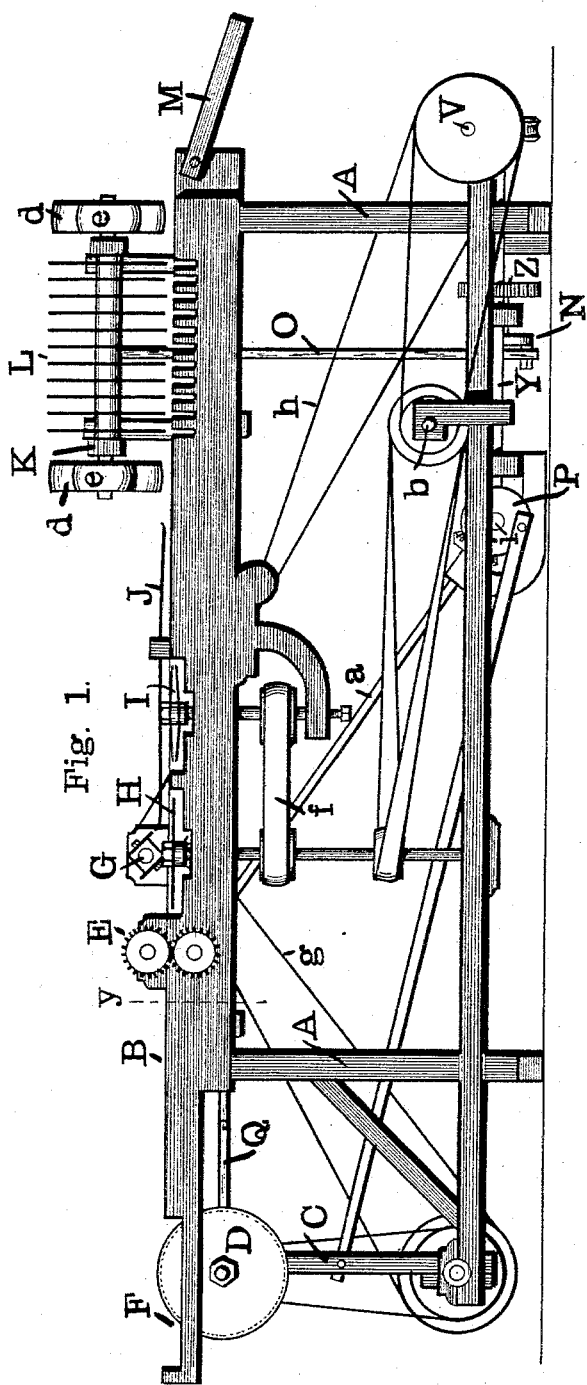
Figure 2:
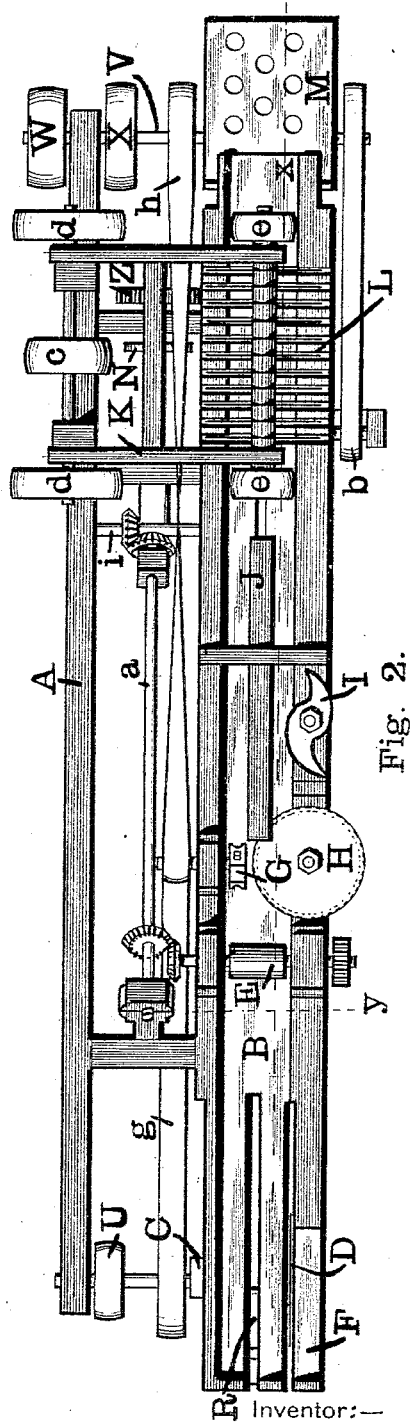

Figure 1 is a side elevation of my improved clothes-pin machine; Fig. 2, a plan of the same; Fig. 3, a vertical longitudinal section of the trough of the same upon line $x$ of Figs. 2 and 4; Fig. 4, a vertical transverse section of the trough at line $y$ of Figs. 1, 2, and 3; Fig. 5, a perspective view of a clothes-pin as produced by my improved machine; and Figs. 6, 7, 8, 9, and 10, perspective views of the stock and product in their various stages of completion.

The product of my improved machine is illustrated in Fig. 5; and it consists of a wooden clothes-pin square in transverse section with a beaded head and with a slot flared at its end. My machine is to be attended by a single operator, who feeds to the machine long boards dressed to a thickness corresponding to the thickness of a clothes-pin. From such boards the machine automatically manufactures the completed clothes-pin.

In the drawings, A represents the frame parts of the machine; B, a longitudinal trough at the top of the machine, the distance between the sides of the trough being equal to the length of the clothes-pin to be made; C, a swinging saw-frame at the initial end of the machine, the frame swinging on an axis-shaft disposed below and at right angles to the trough; D, a circular saw, whose arbor is journaled in boxes at the upper end of this swinging frame, the saw projecting up into the trough through a slot in line with the front side of the trough; E, a pair of feed-rolls arranged across the trough in advance of this saw, and adapted to cause an onward movement of stock, which may be fed between them; F, a transverse gap in the front wall of the trough at the initial end of the machine of the proper width to receive transversely the boards from which the machine fabricates its product; G, a pair of molding cutter-heads projecting inward from the rear wall of the trough, and having cutters whose contour corresponds with the contour of the beading forming the head of the clothes-pin, these cutter-heads being disposed forward of the feed-rolls; H, a circular saw upon a vertical arbor, the periphery of the saw projecting inward from the front wall of the trough a distance corresponding with the depth of the slot of the clothes-pin, the thickness or set of the saw corresponding with the width of the slot of the clothes-pin, the axis of the saw being disposed in about the same horizontal plane with the molding cutter-heads; I, a chamfering-cutter upon a vertical arbor in advance of the slotting-saw, this cutter being formed of a pair of two-toothed blades secured to an arbor, the blades being convex, so as to produce the proper form of chamfer at the end of the slot of the clothes-pin, the periphery of the cutters projecting rearward into the trough as far as the chamfer requires; J, a flexible pressure-bar over the trough in advance of the slotting-saw, adapted to prevent undesired lifting of the stock as it passes through the trough; K, a horizontal oscillating saw-frame pivoted on an axis-shaft supported by the rear of the machine-frame, this shaft being parallel with the trough; L, a gang of circular saws on a single arbor carried in the front end of this oscillating frame, the saws being adapted to work downward in transverse slots in the trough, and cut up stock which may be in the trough below the saws, the distance between the saws corresponding with the width of the clothes-pins; M, a perforated sloping chute-board at the terminal end of the machine, forming a sloping continuation of the floor of the trough; N, a crank upon a revolving shaft at the base of the machine below the oscillating saw-frame K; O, a connecting-rod by which this crank causes vertical oscillations of the saw-frame K; P, a crank upon a revolving transverse shaft at the base of the machine near its rear end, this crank serving, through the medium of a long connecting-rod, to oscillate the swinging saw-frame C; Q, a longitudinal feed-bar carried in guides below the trough and caused to reciprocate by the swinging saw-frame C, to which it is connected by a link;

R, a feed-tooth attached to this bar and projecting upward into the trough through a slot in its initial end; S, a similar tooth projecting upward into the trough through a slot between the slotting-saw and the gang of splitting-saws L; T, transverse strips, shown only in Fig. 3, across the top of trough, between the saws L, intended to prevent the clothes-pins being lifted as the saws rise.

It is desirable that a long table be placed at the gap F at right angles to the trough and flush with the floor of the trough, such table or equivalent trestles serving to support the long boards which the attendant feeds to the machine. The operator takes a long board, as illustrated by Fig. 6, and feeds its end transversely into the trough through the gap F, when the saw D is swung to the right, the end of the board being pushed against the rear wall of the trough. The saw D then swings to the left and saws off a block, as illustrated in Fig. 7, which is the proper length for clothes-pins, and which will neatly fill the trough. The saw D swings again to the right, and the tooth R at the same time advances the block along in the trough toward the feed-rolls. When the saw D has completed its movement to the right, the attendant advances the board so another block may be sawed off. In this manner blocks are rapidly sawed off and advanced to the feed-rolls. The feed-rolls advance the blocks continuously, and the slitting-saw H and molding cutter-heads G provide the blocks with a parallel slot and a head-bead, the blocks thus taking the form illustrated in Fig. 8. The block thus formed continues its advance, and the chamfering-cutter I chamfers the slot and leaves the block in the form as illustrated in Fig. 9. The presser-bar serves to hold the blocks snugly down into the trough. The feed-tooth S now takes a single block as thus far operated upon and advances it rapidly along the trough under the gang of saws L while they are in their upward position. This tooth then retreats for a new block and the gang of saws descends and slits the block into completed clothes-pins, as illustrated in Fig. 10. The gang of splitting-saws then rises, and the pins are prevented from rising by means of the top strips, T. The feed-tooth S now feeds a new block under the gang of splitting-saws, and in so doing pushes the entire lot of completed pins forward. These pins finally reach the perforated chute M, whence they slide into appropriate receptacles, the chute by means of its perforations serving to allow the sawdust and slivers to fall through, so that the clothes-pins are delivered in tidy condition.

It is desirable that such a width of board be chosen for supplying the machine as will produce blocks capable of being split up by the gang-saws into some definite commercial number of clothes-pins—as, for instance, two dozen, or a dozen, or ten. Under such circumstances each discharge from the machine will consist of this chosen number of completed clothes-pins, whereby the machine becomes in a manner self-counting as to its product. Each discharge of the machine may be taken away separately, or the removal may be effected after a given number of discharges.

The means illustrated for transmitting the various motions remain to be described, though they should be obvious from the drawings.

A belt from a suitable driving-shaft goes to pulley $c$ on the axle-shaft of the gang-saw frame, and the gang-saws are driven by belts from pulleys $d$ on this shaft to pulleys $e$ on the arbor of the saws. V is a transverse shaft at the base of the terminal end of the machine. A belt from a suitable driving-shaft goes to pulley W, and drives the shaft V. A belt on pulleys X and U drives the axis-shaft of the swinging saw-frame C from a pulley on which a belt goes to the arbor-pulley of the saw D. Belt $g$, from a pulley on this axis-shaft, drives the lower one of the molding cutter-heads, the upper one of the cutter-heads being driven by a belt, $h$, from a pulley on shaft V. A counter-shaft, $b$, is driven by belt from the shaft V, and in turn drives the arbor of the slotting-saw. A belt, $f$, drives the chamfering-cutter from the arbor of the slotting-saw. The shaft V, by means of worm-gearing, drives a shaft, Y, disposed longitudinally under the terminal end of the machine. The shaft Y, by means of spur-gearing, drives the shaft of the crank N, and by means of bevel-gearing also drives the transverse shaft $i$ of the crank P. This crank-shaft $i$ is bevel-geared to the angular shaft $a$, which is bevel-geared to one of the feed-rolls, the two feed-rolls being geared together.

I claim as my invention—

1. In a clothes-pin machine, the combination of a longitudinal trough, a cutting-off saw at the initial end of the trough in the plane of one side of the trough, a pair of feed-rolls in advance of said saw, a slotting-saw, and pair of molding-heads in advance of the feed-rolls, a chamfering-cutter in advance of the slotting-saw, and a gang of splitting-saws in advance of the chamfering-cutter, substantially as and for the purpose set forth.

2. In a clothes-pin machine, the combination of a trough, a cutting-off saw disposed in the plane of one side of the trough and adapted, by any suitable means, to advance and retreat along a portion of the trough, and a gap in the side wall of the trough in the plane of the advancing and retreating motion of said saw, substantially as and for the purpose set forth.

3. In a clothes-pin machine, the combination of a trough, a cutting-off saw arranged to move in the plane of one side of said trough, a pair of feed-rolls disposed across the trough in advance of said saw, and a reciprocating feed-tooth moving with said saw, and adapted to advance the sawed-off blocks to the feed-rolls, substantially as and for the purpose set forth.

4. In a clothes-pin machine, the combination of a rigid horizontal trough of a width corresponding to the length of the clothes-pins to be made, a pair of horizontal feed-rolls disposed across the trough, one substantially even with its floor and the other above its floor, and a pair of horizontal molding-cutters projecting inward from one side of the trough in advance of said feed-rolls, constructed and arranged substantially as and for the purpose set forth.

5. In a clothes-pin machine, the combination of a rigid horizontal trough of a width corresponding with the clothes-pins to be made, a pair of feed-rolls disposed across said trough, one substantially even with the floor of the trough and the other above the floor, and a slotting-saw projecting inward from one side of the trough toward the opposite rigid wall of the trough, constructed and arranged substantially as and for the purpose set forth.

6. In a clothes-pin machine, the combination of a trough, a pair of feed-rolls disposed across the trough, a horizontal slotting-saw disposed in advance of the feed-rolls and having its periphery projecting inward from one side of the trough, and a chamfering-cutter disposed in advance of the slotting-saw upon a vertical arbor, and having its periphery projecting inward from one side of the trough, substantially as and for the purpose set forth.

7. In a clothes-pin machine, the combination of a rigid horizontal trough of a width corresponding with the length of the clothes-pins to be made, and provided with transverse slots, and a gang of rising and falling splitting-saws disposed with the plane of the saws transverse to the trough and in line with the trough-slots, so as to be capable of vertical reciprocation into and out of said slots, constructed and arranged substantially as and for the purpose set forth.

8. In a clothes-pin machine, the combination of trough B, transversely slotted for a gang of splitting-saws, a gang of splitting-saws, L, and top strips, T, disposed between the saws and secured to the top of the trough, substantially as and for the purpose set forth.

9. In a clothes-pin machine, the combination of a rigid horizontal trough of a width corresponding with the length of clothes-pins to be made, a pair of horizontal feed-rolls disposed across said trough, one substantially even with the floor of the trough and the other above, a mandrel for a chamfering-cutter disposed near one side of the trough in advance of the feed-rolls, and a pair of convex cutter-blades on said mandrel and projecting into the trough toward the opposite rigid wall of the same, constructed and arranged substantially as and for the purpose set forth.

10. In a clothes-pin machine, the combination of a horizontal rigid trough of a width corresponding to the length of the clothes-pins to be made, a pair of horizontal feed-rolls disposed across the same, a longitudinal slot in the floor of the trough, a gang of splitting-saws disposed transverse to the trough in advance of the feed-rolls, and a reciprocating feed-tooth projecting up through said floor-slot between the feed-rolls and the gang of splitting-saws, and adapted to rapidly advance the blocks intermittently to the splitting-saws, constructed and arranged substantially as and for the purpose set forth.

11. In a clothes-pin machine, the combination of a rigid horizontal trough of a width corresponding with the length of the clothes-pins to be made, a pair of horizontal feed-rolls disposed across the trough, one substantially even with the trough-floor and the other above, a pair of horizontal molding-cutters projecting inward from one wall of the trough in advance of the feed-rolls, a vertically-journaled slotting-saw with its periphery projecting into the trough from the side opposite to said molding-cutters, saw D, disposed in line with one wall of the trough at the rear of the feed-rolls, reciprocating feed-tooth R, projecting upward through the slot in the trough-floor between the saw D and the feed-rolls, a gang of splitting-saws in advance of the slotting-saw and disposed with the plane of the saws transverse to the trough, and a reciprocating feed-tooth, S, projecting up through a slot in the trough-floor between the slotting-saw and the splitting-saws, constructed and arranged substantially as and for the purpose set forth.

12. In a clothes-pin machine, the combination of a rigid horizontal trough of a width corresponding to the length of the clothes-pins to be made, swinging cut-off saw D, disposed in the plane of one wall of the trough, a pair of horizontal feed-rolls disposed across the trough in advance of said saw, the oscillating gang-saw frame K, in advance of the feed-rolls disposed with the plane of its saws transverse to the trough, and the two cranks P and N, geared together and respectively linked by connecting-rods to the two saw-frames, substantially as and for the purpose set forth.

JAMES DEARBORN SENATE.

Witnesses:
 W. A. SEWARD,
 J. W. SEE.